UNITED STATES PATENT OFFICE.

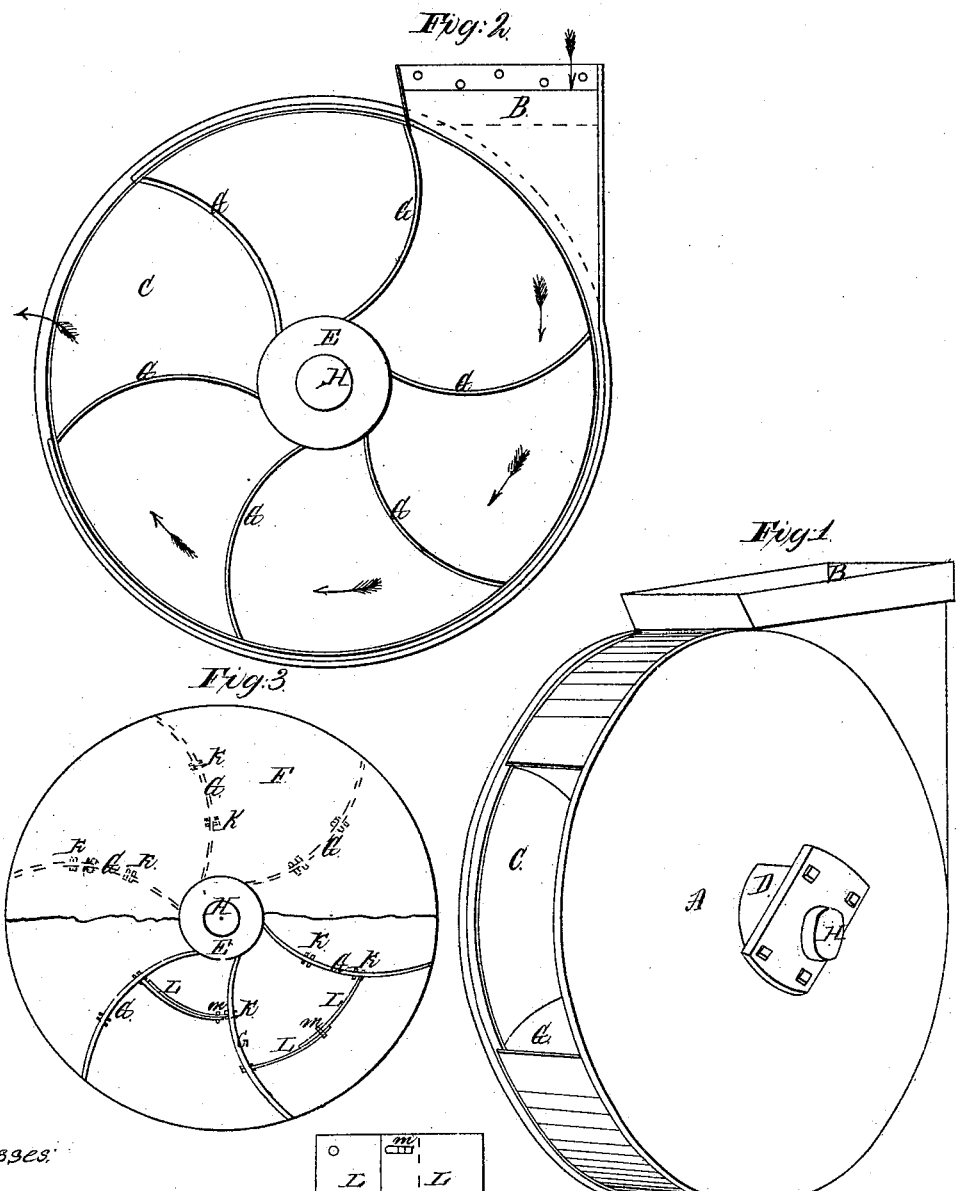

ADOLPHUS LIND, OF SAN FRANCISCO, CALIFORNIA.

WATER-WHEEL.

Specification of Letters Patent No. 29,501, dated August 7, 1860.

*To all whom it may concern:*

Be it known that I, ADOLPHUS LIND, of the city and county of San Francisco and State of California, have invented a new and Improved Water-Wheel; and I do hereby declare that the following is a full, clear, and exact description of the construction and operation of the same, reference being had to the annexed drawings, making a part of this specification.

Figure 1, is a perspective view. Fig. 2, is a view with the head of the cylinder and the flange removed. Fig. 3, represents the wheel with a portion of one of the flanges removed.

A, represents the cylinder, formed with an inlet as shown at B, and an outlet as shown at C.

E, is a hub provided with a flange F, at each end, to which are attached the curved arms or buckets G, G, forming the water wheel.

H, is a shaft passing through, and keyed to, the hub E.

D, is a stuffing box, one of which is formed on head of the cylinder for the shaft H, to pass through.

K, are slots or grooves in the arms or buckets extending the whole depth of the same to receive the dividing plates L, which are to be used to reduce the size of the buckets.

$m$, $m$, are set screws and slots to fasten the dividing plates together when set in proper position.

Operation: Place the cylinder A, inclosing the water wheel, either horizontally or perpendicularly, as the condition of matters may require, allow the water to enter at the inlet B, which passing in the direction indicated by the arrows, will escape at the outlet C, having, in its course, acted with full force upon the arms or buckets G, rotating the wheel, thereby operating to move such machinery as may be properly attached thereto. Should it be desired to lessen the power of the wheel, using a less quantity of water, the dividing plates can be slipped into either of the sets of slots or grooves and be firmly held therein by means of the set screws $m$, $m$; at any time that more or less power is required the plates can be placed accordingly, or be entirely removed.

What I claim as new and desire by Letters Patent, is—

Providing the buckets G, of a water wheel with a series of slots K, in combination with dividing plates L, L, and slots and set screws $m$, $m$, for the purpose of regulating the size of the buckets.

ADOLPHUS LIND.

Witnesses:
CHAS. R. BOND,
F. I. THIBAULT.